June 24, 1941.   F. C. LEONARD   2,246,690
THERMOSTATIC MATERIAL
Filed Oct. 6, 1937
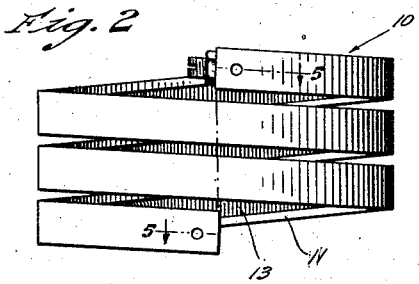
Fig. 2
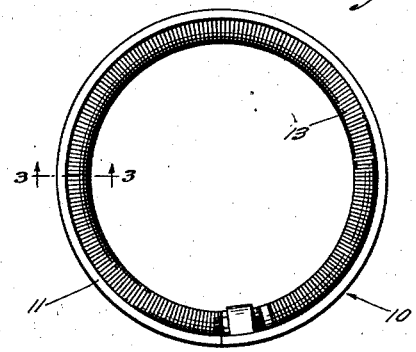
Fig. 1
Fig. 3
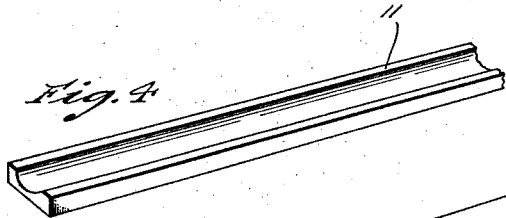
Fig. 4
Fig. 6
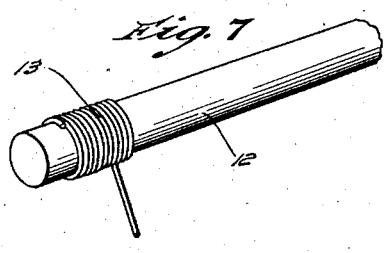
Fig. 7
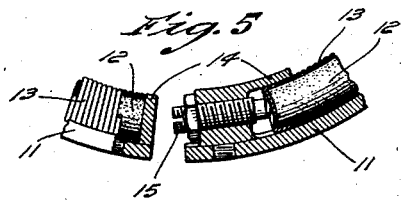
Fig. 5
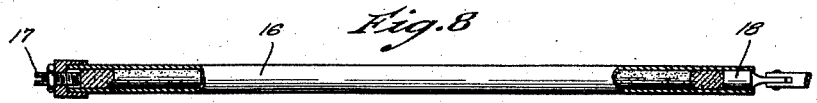
Fig. 8
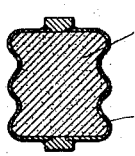
Fig. 9
Inventor
Frederick C. Leonard
By Nathaniel Frucht
Attorney Patented June 24, 1941

2,246,690

UNITED STATES PATENT OFFICE 2,246,690

THERMOSTATIC MATERIAL

Frederick C. Leonard, Cranston, R. I.

Application October 6, 1937, Serial No. 167,579

6 Claims. (Cl. 297—11)

My present invention relates to the thermostatic art, and has particular reference to thermostatic material.

It is the principal object of my invention to use a very expansible material, heretofore not believed usable in thermostatic apparatus.

It is a further object of my invention to provide a suitable arrangement of parts for using a very expansible thermostatic material of the solid type.

It is an additional object of my invention to provide an arrangement for limiting lateral expansion of an expansible thermostatic material, while permitting linear expansion thereof.

With the above and other objects and advantageous features in view, my invention consists of a novel arrangement of parts more fully disclosed in the detailed description following, in conjunction with the accompanying drawing, and more specifically defined in the claims appended thereto.

In the drawing:

Fig. 1 is a plan view of a novel thermostatic unit;

Fig. 2 is a side elevation thereof;

Fig. 3 is a section on the line 3—3 of Fig. 1;

Fig. 4 is a perspective view of a portion of the base;

Fig. 5 is an enlarged sectional detail on the line 5—5 of Fig. 2;

Fig. 6 is a perspective view of one end of the thermostatic element;

Fig. 7 is a view similar to Fig. 6, showing its covering material;

Fig. 8 is a sectional detail of a modified construction for the unit; and

Fig. 9 is a sectional detail of a further modified form.

The thermostatic arrangement of standard type include units of thermostatic metal, and expansible containers filled with expansible liquids. The liquid type has the greater expansion when subjected to temperature rise, but is dependent on the flexibility of the container and is relatively slow in response, whereas the thermostatic metal strip, while more responsive, does not have a high expansion coefficient.

I have found, however, that gutta-percha has a very large expansion with respect to metals, the coefficient of linear expansion being 0.000598, whereas brass has a coefficient of only 0.000019. I have therefore devised an arrangement capable of utilizing gutta-percha.

To this end, I have devised a flexible container for a rod of gutta-percha, which will permit linear expansion, but will restrict lateral expansion, whereby full advantage of the linear expansion is obtained. Thus, the thermostatic unit 10, see Figs. 1 and 2, comprise a metallic base 11 of plano-concave form, in which the expansible element is seated, this element comprising a long rod 12 of gutta-percha which is covered by a wire coil 13 closely wound thereon; the ends of the rod are seated in housings 14, see Fig. 5, secured to the base 11 as by welding, an adjusting element such as a screw 15, being mounted in the housing for longitudinal adjustment of the gutta-percha rod. The base and the rod are preferably in helical coil form.

With the arrangement disclosed, a rise in temperature causes an elongation of the gutta-percha rod, which results in a movement of one end of the unit if the other end is held fixed. The unit may therefore be used in any standard type of thermostat, with one end adjustably set, and the other end movable in response to the temperature change to move a mixing valve, a switch, an electric contact, or the like, as desired.

If preferred, a metal shell 16, see Fig. 8, may be rolled around a gutta-percha rod, one end of the shell having a length adjusting element, such as a screw 17 mounted therein for longitudinal movement to engage one end of the gutta-percha rod, a movable plunger 18 being slidably mounted in the other end of the shell and being contacted, by and secured to, if desired, the other end of the gutta-percha rod for movement in response to temperature change.

If a bellows type of thermostatic unit is desired, such as disclosed in Fig. 9, the gutta-percha 19 may be molded under suitable temperature and pressure conditions, into a bellows container of metal 20, and then hermetically sealed. If any leak occurs, there is no loss of the thermostatic material, as occurs with liquids, and therefore no loss of operative usefulness.

Although I have disclosed an arrangement suitable for gutta-percha, other materials, either natural or synthetic, having similar properties may be used instead. Thus, rubber is suitable and has the advantage of being readily molded.

While I have described specific structural embodiments of my invention, it is obvious that desired changes in the arrangement of the parts, in the particular thermostatic element used, in the size and the operation of the parts, may be made to suit the requirements for different thermostatic uses.

I claim:

1. In a thermostatic unit, a metallic base, a housing at each end thereof, a rod of an expansible non-metallic solid material having its ends seated in said housings, means for adjusting one end of said rod longitudinally with respect to its cooperating housing, and a flexible metallic cover for said rod resisting lateral expansion of said rod and permitting longitudinal expansion thereof.

2. In a thermostatic unit, a metallic base, a housing at each end thereof, a rod of gutta percha having its ends seated in said housings, means for adjusting one end of said rod longitudinally with respect to its cooperating housing, and a flexible metallic cover for said rod resisting lateral expansion of said rod and permitting longitudinal expansion thereof.

3. In a thermostatic unit, a spiral base, a housing at each end thereof, a rod of expansible non-metallic solid material having its ends secured in said housings, means for manually regulating one end of said rod longitudinally with respect to its cooperating housing, said means including a cap for said rod end and means for moving said cap in the housing, and a helical wire wound about said rod.

4. In a thermostatic unit, a helical base, a housing at each end thereof, a rod of gutta percha having its ends secured in said housings, means for manually regulating one end of said rod longitudinally with respect to its cooperating housing, said means including a cap for said rod end and means for moving said cap in the housing, and a helical wire wound about said rod.

5. In a thermostatic unit, a helical base having a concave surface, a housing at each end thereof, a rod of expansible non-metallic solid material having its ends secured in said housings and seated in said concave surface, means for manually regulating one end of said rod longitudinally with respect to its cooperating housing, said means including a cap for said rod end and means for moving said cap in the housing, and a helical wire wound about said rod.

6. In a thermostatic unit, a helical base having a concave surface, a housing at each end thereof, a rod of gutta percha having its ends secured in said housings and seated in said concave surface, means for manually regulating one end of said rod longitudinally with respect to its cooperating housing, said means including a cap for said rod end and means for moving said cap in the housing, and a helical wire wound about said rod.

FREDERICK C. LEONARD.